United States Patent [19]

Clancy

[11] E Patent Number: Re. 32,004

[45] Reissued Date of Patent: Oct. 15, 1985

[54] TWO-SIDED PUZZLE

[76] Inventor: Robert E. Clancy, 13 Mays Ave., Hornell, N.Y. 14843

[21] Appl. No.: 616,955

[22] Filed: Jun. 4, 1984

Related U.S. Patent Documents

Reissue of:

[64] Patent No.: 4,333,652
Issued: Jun. 8, 1982
Appl. No.: 196,739
Filed: Oct. 14, 1980

[51] Int. Cl.[4] ..... A63F 9/08
[52] U.S. Cl. ..... 273/153 S; 273/157 R
[58] Field of Search ..... 273/153 S, 157 R

[56] References Cited

U.S. PATENT DOCUMENTS

| | | | |
|---|---|---|---|
| 2,948,535 | 8/1960 | Ellman | 273/153 S X |
| 3,332,687 | 7/1967 | Bennett | 273/157 R |
| 4,097,049 | 6/1978 | DeVos et al. | 273/153 S |

*Primary Examiner*—Anton O. Oechsle
*Attorney, Agent, or Firm*—Cumpston & Shaw

[57] ABSTRACT

A two-sided puzzle having a puzzle comprising puzzle members on each side thereof. One or more puzzle members on one side are each coupled to a puzzle member on the opposite side. The puzzle members are arranged or oriented on each side such that matching or assembling the puzzle members on one side automatically unmatches or disassembles the puzzle members on the opposite side.

10 Claims, 41 Drawing Figures

TWO-SIDED PUZZLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to games for children, and more particularly to toy puzzles that are amusing and of an educational value. Each toy puzzle is two-sided; that is, has a puzzle of each side thereof having puzzle members arranged such that matching or assembling the puzzle members on one side automatically unmatches or disassembles the puzzle members on the opposite side.

2. Description of the Prior Art

U.S. Pat. No. 524,703 relates to a two-sided combination game or puzzle comprising a board having a plurality of short, parallel slots joined together at one end by a common slot. Each short slot slidably receives a white or black checker. The number of short slots exceeds the number of checkers to permit rearranging the checkers. The object of the game is to manipulate the checkers to arrange the checkers in a predetermined orientation; for example, with all white checkers together in a row and all of the black checkers adjacent thereto in a row. The puzzle is the same on each side to facilitate playing the puzzle from either side.

U.S. Pat. No. 1,975,667 discloses a one-sided puzzle in which captive blocks are slidably arranged in slots in a box or frame. The face of each block represents a portion of an overall picture or representation. The purpose of the puzzle is to arrange the blocks in their proper order to complete the picture or representation.

U.S. Pat. No. 2,948,535 relates to a two-sided puzzle having a board provided with a plurality of mazes. Each maze has a plurality of connecting slots extending through the board. A plurality of puzzle blocks on one side of the puzzle each have on their face a portion of an overall picture or representation. Each puzzle block is connected by a post slidable within a slot to a similar oriented block on the opposite side of the board. The faces of the blocks on the opposite side each represent a portion of an overall picture or representation completely different from the picture on the one side. The result is a toy game having a different puzzle on opposite sides thereof in which the puzzle blocks are captive on the board. Solving the puzzle on one side by properly arranging the blocks to form a picture automatically solves the puzzle by forming a picture on the opposite side.

A primary problem with the aforementioned prior art puzzles is the need to unmatch or disassemble the puzzle members of each puzzle after it has been assembled or solved in order to place it in condition to be replayed or reassembled. None of such puzzles are capable of providing continuous problem solving situations in which solving a puzzle on one side automatically places the puzzle on the opposite side in an unsolved condition.

SUMMARY OF THE INVENTION

A primary object of the present invention is to provide a two-sided puzzle in which matching or assembling puzzle members on one side to solve a puzzle automatically unmatches or disassembles the puzzle members on the opposite side to present a new problem to be solved.

The two-sided puzzle of this invention in one aspect comprises a flat support member having upper and lower side surfaces, and an elongated slot extending therethrough. A first pair of puzzle members adjacent the upper side surface are movable between matched and unmatched positions. A second pair of puzzle members are movable between matched and unmatched positions adjacent the lower side surface. Means are provided extending through and slidable within the slot for rigidly coupling the first and second pairs of puzzle members together whereby movement of one of the first and second pairs to its matched position automatically moves the other of the first and second pairs to an unmatched position.

In other aspects of the invention, each first and second pair of puzzle members has at least one movable member relative to the other. The coupling means comprises a connecting member slidable within the slot for rigidly joining the movable members in a predetermined orientation.

In a further aspect of the invention, the two-sided puzzle has a plurality of unconnected slots extending through the support member, each having one or more puzzle members associated therewith. Also, at least one puzzle member of each first and second pair is rigidly mounted on the upper and lower side surfaces respectively adjacent an end of a slot.

The primary advantage of this invention in all of its aspects is to provide an amusing and educational two-sided puzzle in which matching or assembling puzzle members on one side for solving a puzzle automatically unmatches or disassembles the puzzle members on the opposite side. Accordingly, when the two-sided puzzle is turned around, the puzzle members on the opposite size are in condition to be matched or assembled. An unsolved puzzle is therefore always in front of the player. With this two-sided puzzle, the need to unmatch or disassemble puzzle members after a puzzle is solved is eliminated.

The two-sided puzzle of this invention further provides the opportunity for development of identification skills (object or shape or abstract, depending on the subject matter) as well as pattern formation skills.

Identification or recognition of the correct solution can be a conscious act depending on previous usage or prior knowledge from whatever source, or it can be achieved by trial and error. However, depending on the slot configuration, a pattern or sequenced movement of puzzle members may be required. The puzzle members cannot be simply placed into what might be their correct position. Solving the proper pattern or moving the puzzle members in sequence to realize their correct position is as much a problem to be solved as is recognition of what is to be made.

The two-sided puzzle also does not require a framed outline or border into which the puzzle members have to be inserted. The plane or surface area on which proper assembly takes place, in being free of non-essential components, enables the outline of the correct solution to be tactily recognized. Such recognition is especially appropriate for individuals with severe vision problems, for it helps in the development of finger-touch or tactile identification skills.

BRIEF DESCRIPTION OF THE DRAWINGS

In the detailed description of the invention presented below, reference is made to the accompanying drawings, in which.

DETAILED DESCRIPTION OF THE INVENTION

Figure 1:
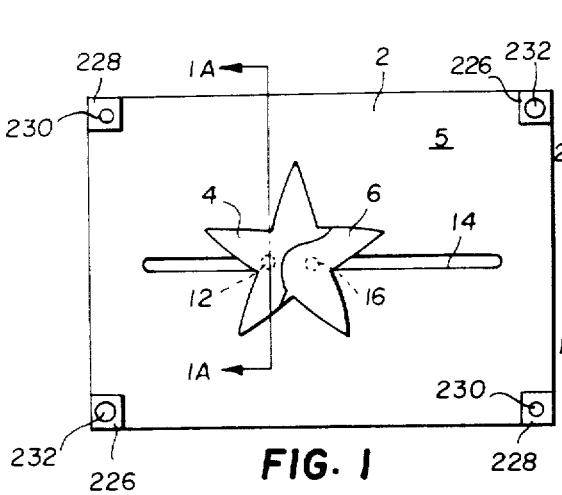
FIG. 1 is a top plan view of one embodiment of a two-sided puzzle of this invention showing the puzzle members on the upper side surface in their assembled or matched position.
Figure 1A:
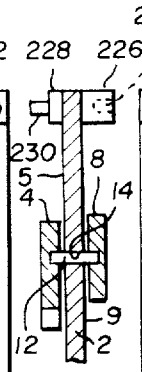
FIG. 1A is a section view taken substantially along line 1A—1A of FIG. 1.
Figure 3:
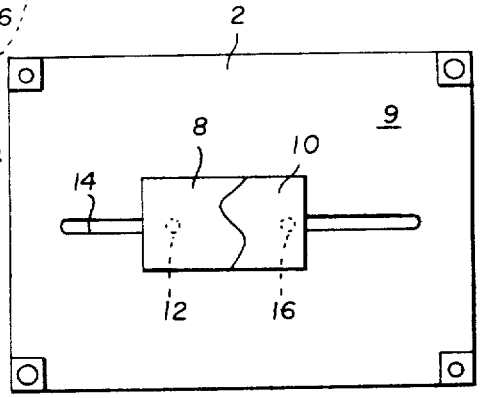
FIG. 3 is the same view as FIG. 2, but showing the puzzle members on the lower side surface rearranged into their matched or assembled position.
Figure 2:
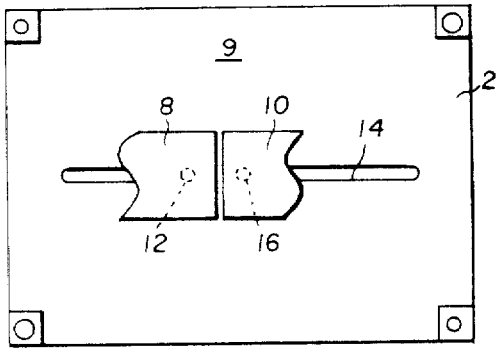
FIG. 2 is a bottom view of the puzzle of FIG. 1 rotated about its longitudinal center line and showing the puzzle members on the lower side surface in their unmatched or disassembled position.
Figure 4:
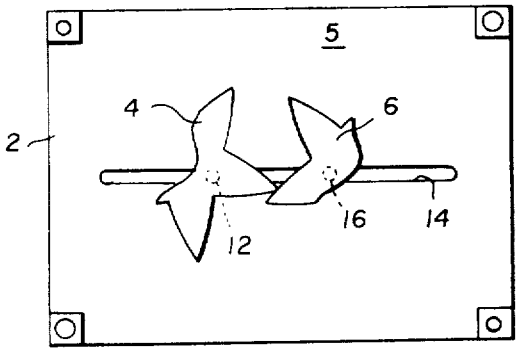
FIG. 4 is a top plan view similar to FIG. 1 of the puzzle of FIG. 3 rotated about its longitudinal center line and showing the puzzle members on the upper side surface in their unmatched or disassembled position.
Figure 5:
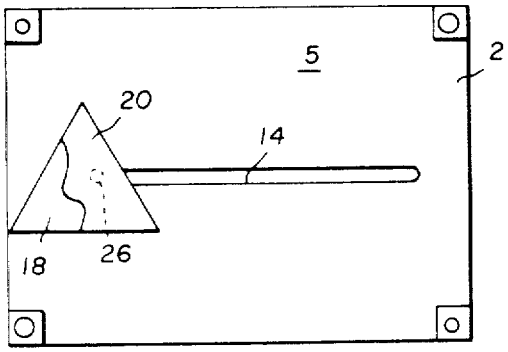
FIGS. 5–8 are views similar to FIGS. 1–4 respectively of another embodiment of the two-sided puzzle.

Referring now to FIGS. 1, 1A, 2, 3 and 4 of the drawings, one embodiment of a two-sided puzzle of this invention is disclosed. The puzzle comprises a preferably flat support member 2 made of any suitable material such as wood or cardboard. A pair of puzzle members 4, 6 are movably mounted on one side surface 5 of the support member for movement into a matched or assembled position to form a star as seen in FIG. 1. A corresponding pair of puzzle members 8, 10 respectively is arranged in an unmatched or disassembled position on the opposite side surface 9 of the support member as seen in FIG. 2. Puzzle members 4, 8 are secured together in a fixed orientation relative to one another by a pin 12 extending through and slidably mounted within elongated slot 14 extending through support member 2 (FIG. 1A). Each puzzle member 4, 8 is secured by any suitable means to one end of pin 12. Puzzle members 6, 10 are likewise secured together in a fixed relative orientation by a similar pin 16. Accordingly, when puzzle members 4, 6 are rotated and slidably moved manually along slot 14 into the matched or assembled position forming the star figure of FIG. 1, the puzzle members 8, 10 on the opposite side are moved into an unmatched or disassembled position as seen in FIG. 2. When the puzzle player slidably and rotatably moves puzzle members 8, 10 into their assembled position forming a rectangular block as seen in FIG. 3, this automatically positions the opposite puzzle members 4, 6 into their disassembled position as seen in FIG. 4. Accordingly, the puzzle board 2 at all times presents one matched or assembled and one unmatched or disassembled puzzle.

With reference to the remaining embodiments of the two-sided puzzles of this invention, a section view through each puzzle is omitted since the support members and interrelation between the puzzle members on opposite sides of the support member via a pin and slot connection are substantially identical to FIG. 1A. Differences between the puzzles primarily resides in the shape of the assembled puzzle members, and the number and configuration of the puzzle members and slots. The support member 2 and certain other identical parts will be denoted by the same numerals in all of the embodiments.

Figure 7:
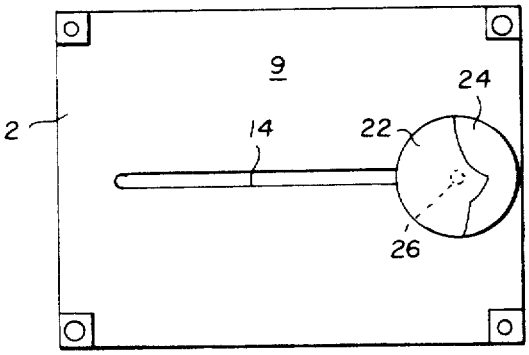
Figure 6:
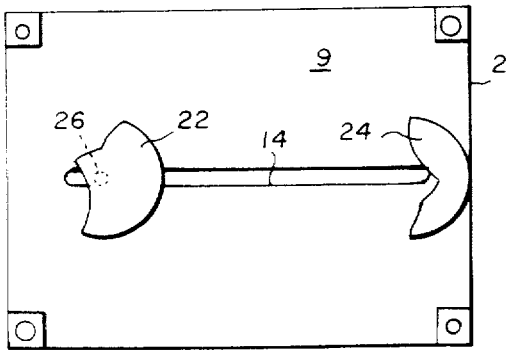
Figure 8:
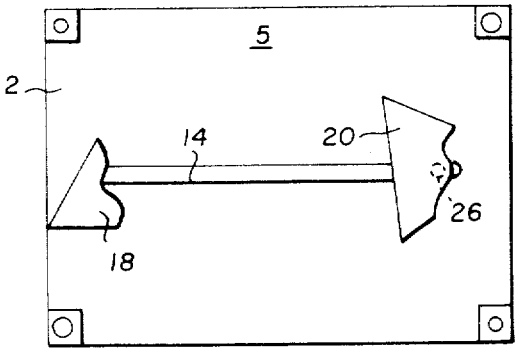

With reference to the puzzle shown in FIGS. 5–8, puzzle members 18, 20 form a triangular figure when assembled (FIG. 5) whereas puzzle members 22, 24 on the opposite side form a circular figure when assembled (FIG. 7). Puzzle member 18 on side 5 and puzzle member 24 on the opposite side 9 are rigidly secured or fixed to support member 2 at opposite ends of slot 14 by any suitable means such as glue, cement, screws, nails or the like. Puzzle members 20, 22 are secured together by pin 26 slidably mounted within slot 14. When puzzle members 18, 20 are assembled on one side (FIG. 5), puzzle members 22, 24 are disassembled on the opposite side (FIG. 6). When puzzle member 22 is rotatably and slidably moved into an assembled position with fixed member 24 (FIG. 7), opposite puzzle member 20 is automatically moved into a disassembled position in relation to fixed member 18 (FIG. 8).

Figure 9:
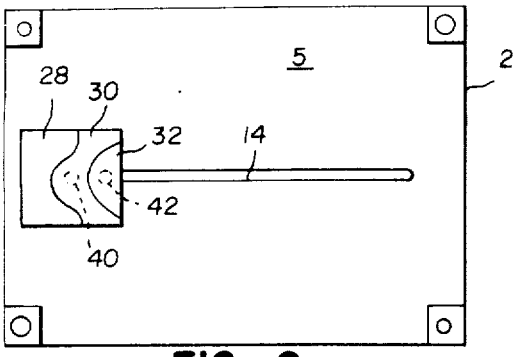
FIGS. 9–12 are views similar to FIGS. 1–4 respectively of still another embodiment of the two-sided puzzle.
Figure 11:
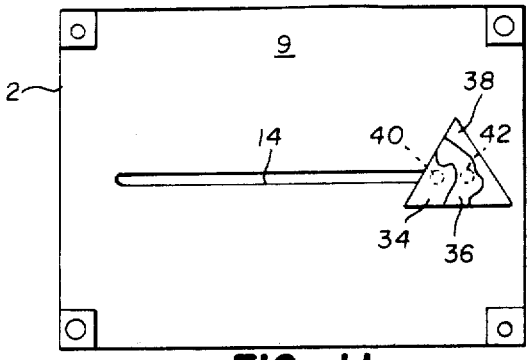
Figure 10:
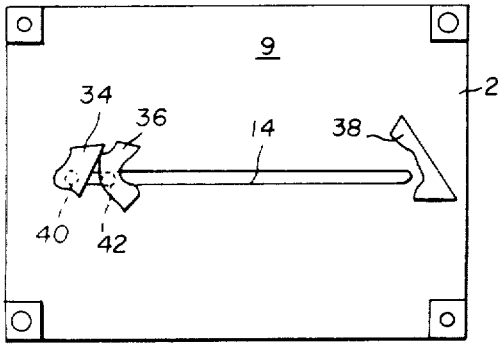
Figure 12:
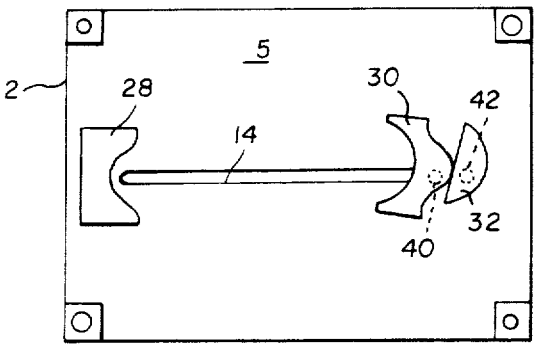

With reference to the puzzle shown in FIGS. 9–12, three puzzle members 28, 30, 32 are used on side 5 to form a square or rectangular figure when assembled (FIG. 9). Three puzzle members 34, 36, 38 on the opposite side 9, when assembled, form a triangular figure (FIG. 11). Puzzle members 28, 38 are secured or fixed to opposite sides 5, 9 respectively adjacent opposite ends of slot 14. In this puzzle, movable puzzle members 30, 34 are secured together by pin 40, and movable puzzle members 32, 36 are secured together by a pin 42. Accordingly, when puzzle members 30, 32 are rotatably and slidably rearranged into an assembled position with fixed member 28 to form the square figure (FIG. 9), puzzle members 34, 36 are moved into a disassembled position in relation to fixed member 38 as seen in FIG. 10. When the disassembled puzzle members 34, 36 on side 9 are moved into an assembled position with fixed member 38 to form the triangular figure (FIG. 11), puzzle members 30, 32 on the opposite side 5 are placed in a disassembled position in relation to fixed member 28 (FIG. 12).

Figure 13:
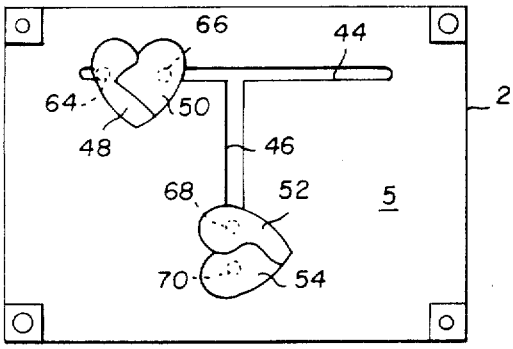
FIGS. 13–16 are views similar to FIGS. 1–4 respectively of still another embodiment of the two-sided puzzle.
Figure 15:
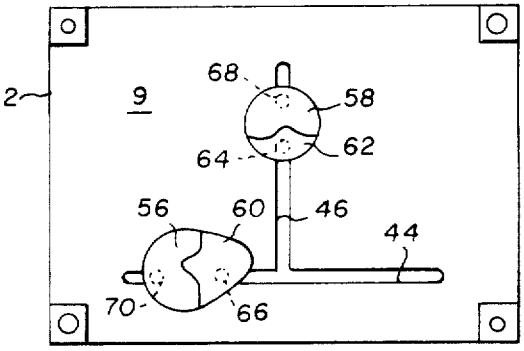
Figure 14:
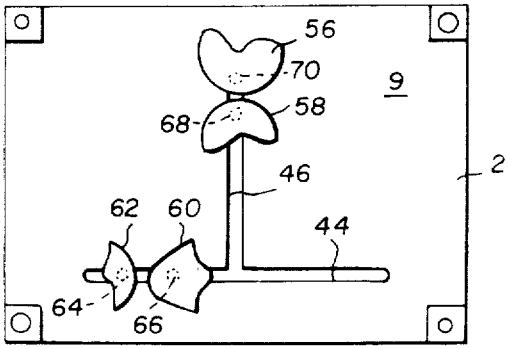
Figure 16:
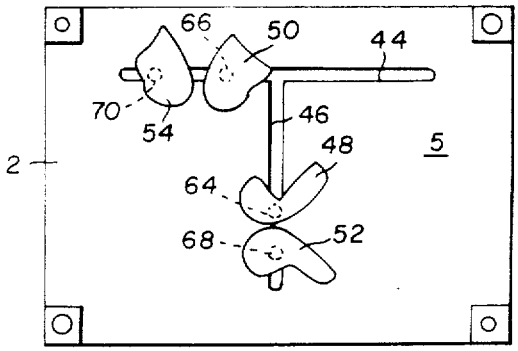

With reference to the embodiment of the puzzle shown in FIGS. 13–16, support member 2 has a pair of interconnecting slots 44, 46 extending therethrough arranged substantially at right angles. Two pairs of puzzle members 48, 50 and 52, 54 are provided on side 5 of the puzzle for forming two heart-shaped figures when properly assembled as seen in FIG. 13. Puzzle members 48, 50, 52 and 54 are rigidly secured to corresponding puzzle members 62, 60, 58, 56 on the opposite side 9 by pins 64, 66, 68, 70 slidably mounted within slots 44, 46. Puzzle members 56, 58, 60, 62 are disassembled (FIG. 14) when puzzle members 48, 50, 52, 54 are assembled (FIG. 13). When puzzle members 56, 58, 60, 62 on side 9 are manually manipulated to form assembled circular and conically shaped figures (FIG. 15), puzzle members 48, 50, 52, 54 on side 5 are moved to disassembled positions (FIG. 16).

Figure 17:
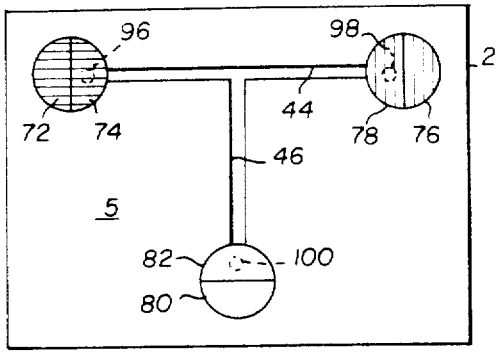
FIGS. 17–20 are views similar to FIGS. 1–4 respectively of another embodiment of the two-sided puzzle.
Figure 19:
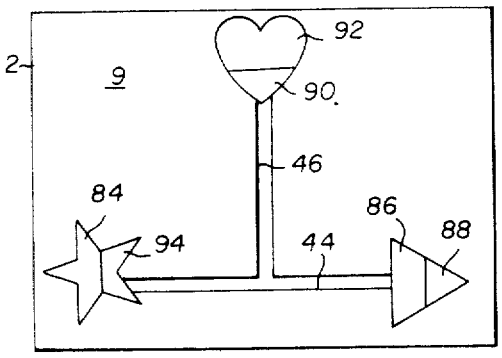
Figure 18:
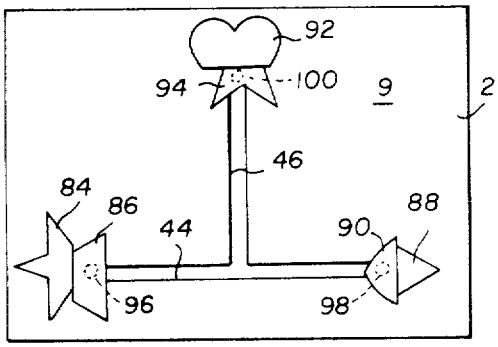
Figure 20:
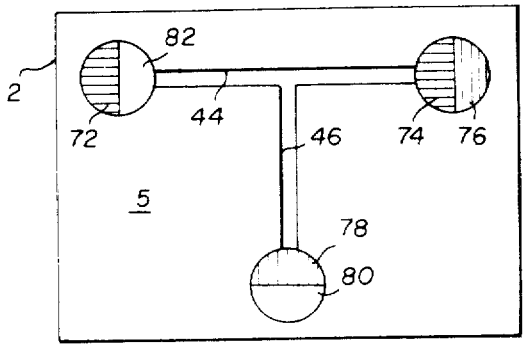

With reference to the puzzle shown in FIGS. 17–20, six puzzle members 72, 74, 76, 78, 80, 82 are mounted on side 5 of the support member to form, when assembled, three white, blue and red colored circular figures (FIG. 17). The puzzle members 80, 82 are colored white, puzzle members 72, 74 are colored blue denoted by matching spaced, parallel horizontal lines, and puzzle members 76, 78 are colored red denoted by spaced, parallel vertical lines. The object of the puzzle is to assemble each circular figure with matching colored parts as seen in FIG. 17. Three of the puzzle members 72, 76, 80 are rigidly secured to side 5 of the support member with one member adjacent each end of slots 44, 46. On the opposite side 9 of the support member, six corresponding puzzle members 84, 86, 88, 90, 92, 94 are provided, three of which (84, 88, 92) are secured to support member 2 adjacent ends of slots 44, 46. The remaining puzzle members 86, 90, 94 are rigidly secured in a desired orientation to corresponding puzzle members 74, 78, 82 respectively by pins 96, 98, 100 respectively slidably captured within the slots. Accordingly, when puzzle members 74, 78, 82 are moved by rotating and sliding movement into assembled positions, three circular figures of different colors are achieved as seen in FIG. 17. At the same time, three unmatched or disassembled figures are obtained on the opposite side 9 of the puzzle as seen in FIG. 18. When the unmatched figures of FIG. 18 are assembled into matched pairs to form a heart, star and triangle (FIG. 19), the puzzle members on opposite side 5 form three circular figures with unmatched colors (FIG. 20).

In a modification, not shown, of each of the embodiments of the invention described heretofore and to be described hereinafter, the puzzle members on each side can be of identical outer shape, such as semi-circular, square, rectangular or the like. However, the faces of one or more pairs of puzzle members on each side are of matching color or pictorial representation. One or more of the puzzle members on one side are rigidly joined to corresponding members on the opposite side such that when a pair of puzzle members on one side are matched to form, for example, a square having a totally blue face or complete pictorial representation, the corresponding pair of identically shaped puzzle members on the opposite side form a square having a face of unmatched colors or pictorial representation.

Figure 21:
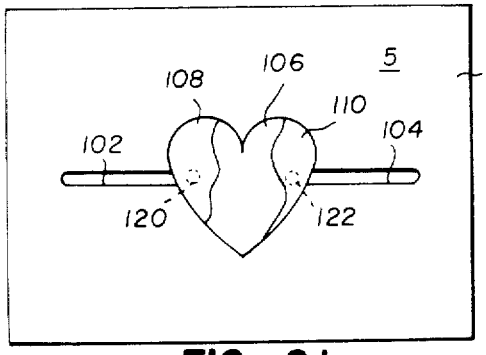
FIGS. 21–24 are views similar to FIGS. 1–4 respectively of still another embodiment of the two-sided puzzle.
Figure 23:
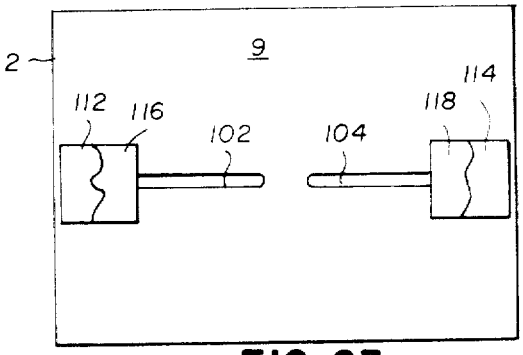
Figure 22:
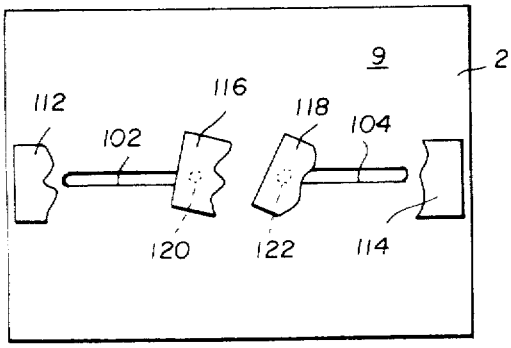
Figure 24:
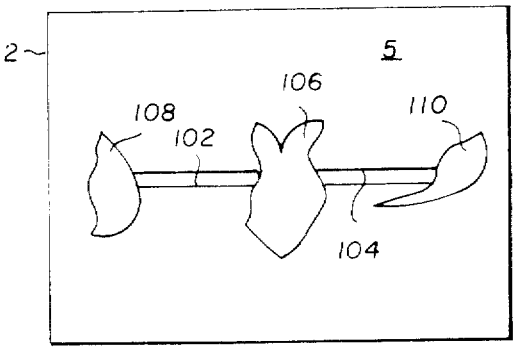

In the embodiment of the puzzle shown in FIGS. 21–24, support member 2 has a pair of aligned slots 102, 104 extending therethrough with a space between adjacent ends thereof. A puzzle member 106 is positioned in the space on one side 5 and rigidly secured to member 2 by any suitable means. Two movable puzzle members 108, 110 are also provided on side 5, one on each side of puzzle member 106. By properly sliding and rotating puzzle members 108, 110 on side 5, the puzzle is assembled forming a heart figure (FIG. 21). The opposite side 9 of the puzzle has two puzzle members 112, 114 rigidly secured or fixed to support member 2 adjacent the outer ends of slots 102, 104 respectively. Two movable puzzle members 116, 118 also positioned on opposite side 9 are secured to corresponding puzzle members 108, 110 respectively, by pins 120, 122 respectively slidably movable within slots 102, 104 respectively. As seen in FIG. 22, puzzle members 112, 114, 116, 118 are in a disassembled position when puzzle members 106, 108, 110 are in an assembled position (FIG. 21). When puzzle members 116, 118 are moved relative to fixed members 112, 114 into an assembled position forming two square figures (FIG. 23), the heart figure is disassembled as seen in FIG. 24.

Figure 25:
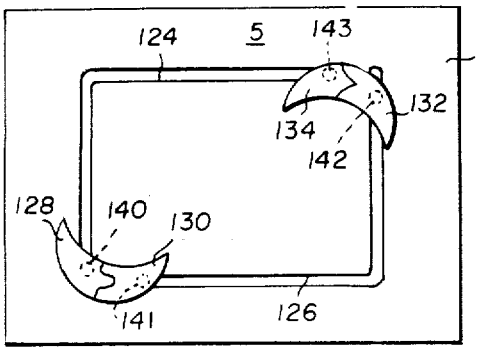
FIGS. 25–28 are views similar to FIGS. 1–4 respectively of still another embodiment of the two-sided puzzle.
Figure 27:
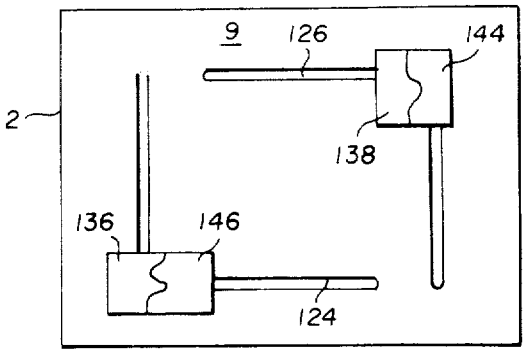
Figure 26:
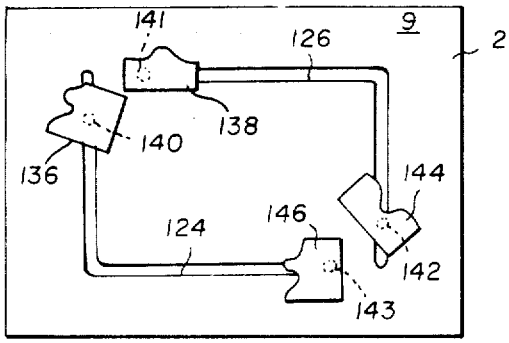
Figure 28:
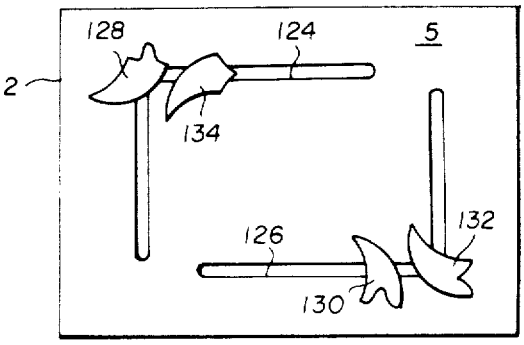

With reference to the puzzle of FIGS. 25–28, a pair of L-shaped slots 124, 126 extend through support member 2 in inverted relation with ends thereof spaced apart. Two pairs of puzzle members 128, 130 and 132, 134 on side 5 of the support member are movable along slots 124, 126 into an assembled position forming two crescent-shaped figures (FIG. 25). In this position, corresponding puzzle members 136, 138, 144, 146 on the opposite side 9 are in a disassembled position as seen in FIG. 26. The corresponding puzzle members are secured together by pins 140, 141, 142, 143 slidably mounted within slots 124, 126. When puzzle members 136, 138, 144, 146 are moved into an assembled position forming square and rectangular figures (FIG. 27), puzzle members 128, 130, 132, 134 on side 5 are shown disassembled (FIG. 28).

Figure 29:
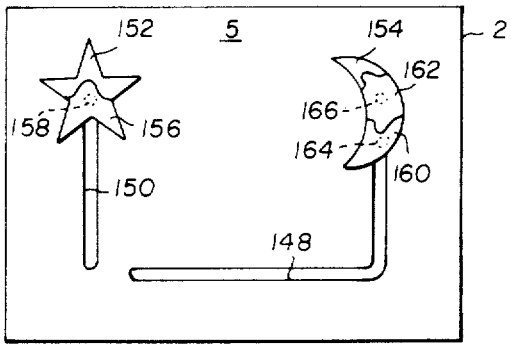
FIGS. 29–32 are views similar to FIGS. 1–4 respectively of still another embodiment of the two-sided puzzle.
Figure 31:
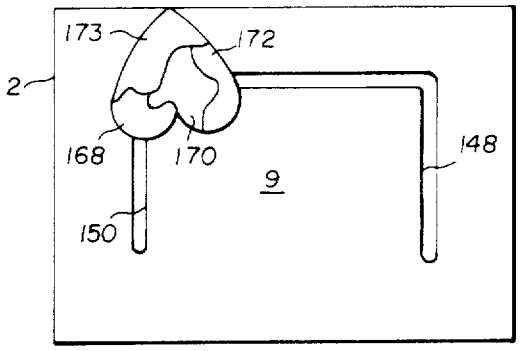
Figure 30:
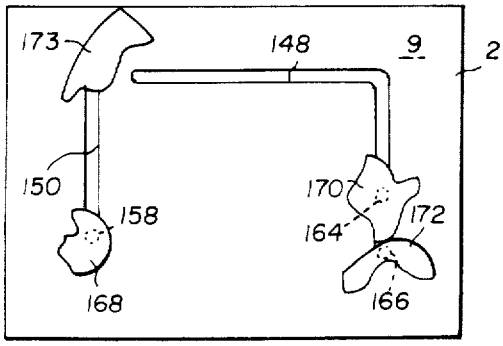
Figure 32:
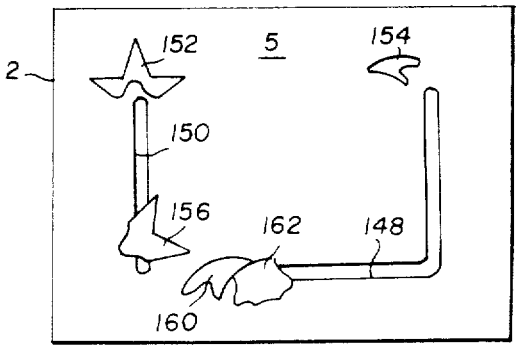

With reference to the puzzle shown in FIGS. 29–32, an L-shaped slot 148 and a single elongated slot 150 extend through support member 2. Two puzzle members 152, 154 forming parts of a star and crescent are rigidly secured to side 5 of support member 2 adjacent one end of each slot. A puzzle member 156 forming the remainder of the star (FIG. 29) is movable via a pin 158 within slot 150. Two puzzle members 160, 162 forming parts of the crescent are movable via pins 164, 166 respectively within slot 148 into meshing engagement with puzzle member 154 to form a crescent (FIG. 29). In this position, puzzle members 168, 170, 172 on the opposite side 9 corresponding to puzzle members 156, 160, 162 respectively, and secured thereto by pins 158, 164, 166 respectively are in a disassembled position (FIG. 30). Also, a puzzle member 173 forming part of a heart is rigidly secured to side 9 of the support member in the space between adjacent ends of slots 148, 150. When the disassembled puzzle (FIG. 30) is assembled to form a heart figure as seen in FIG. 31, puzzle members 152, 154, 156, 160, 162 on the opposite side 5 are in a disassembled position (FIG. 32). Members 152 and 156, on the one hand, and members 154, 160 and 162, on the other hand, can be considered to comprise respective sets of puzzle members. In like manner, members 168 and 173, on the one hand, and members 170 and 172, on the other hand, can be regarded as respective pairs of puzzle members.

Figure 33:
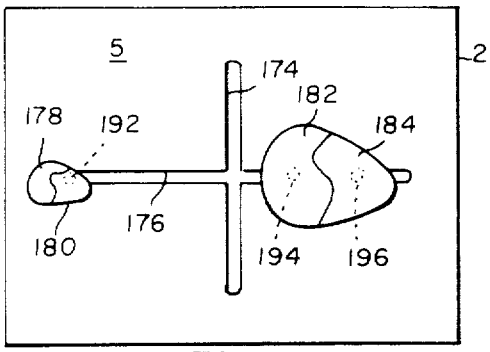
FIGS. 33—36 are views similar to FIGS. 1–4 respectively showing still another embodiment of the two-sided puzzle.
Figure 35:
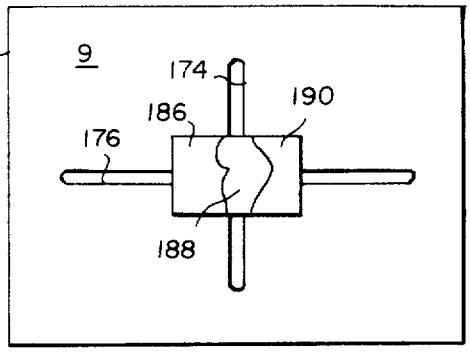
Figure 34:
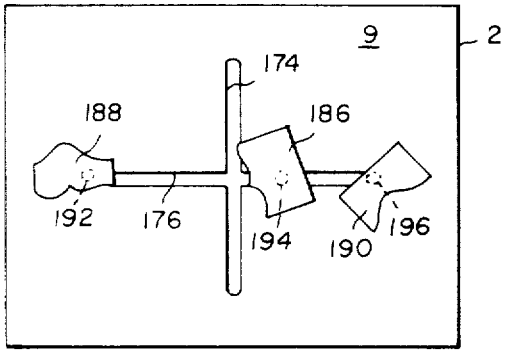
Figure 36:
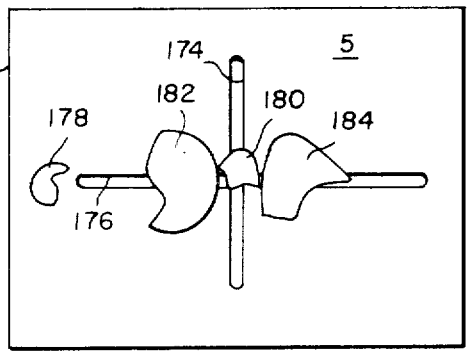

With reference to the puzzle shown in FIGS. 33–36, support member 2 is provided with intersecting slots 174, 176. A puzzle member 178 is rigidly secured to side 5 of the support member adjacent one end of slot 176. The remaining puzzle members 180, 182, 184 are movable within the slots into an assembled position forming a pair of conical figures (FIG. 33). In this assembled position, corresponding puzzle members 188, 186, 190 respectively on the opposite side 9 are disassembled (FIG. 34). Puzzle members 180, 182, 184 are secured to corresponding puzzle members 188, 186, 190 by pins 192, 194, 196 respectively slidable within the slots. When puzzle members 188, 186, 190 are slidably and rotatably movable into an assembled position to form a rectangular figure (FIG. 35), puzzle members 180, 182, 184 on the opposite side 9 are moved into a disassembled position (FIG. 36).

Figure 37:
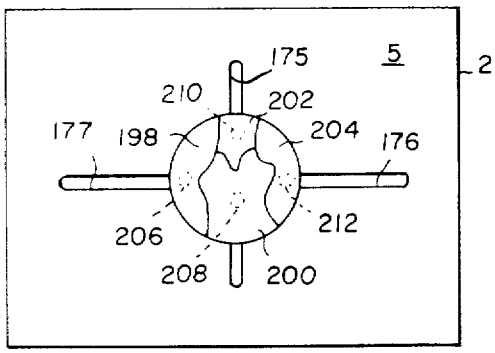
FIGS. 37–40 are views similar to FIGS. 1–4 respectively of still another embodiment of the two-sided puzzle.
Figure 39:
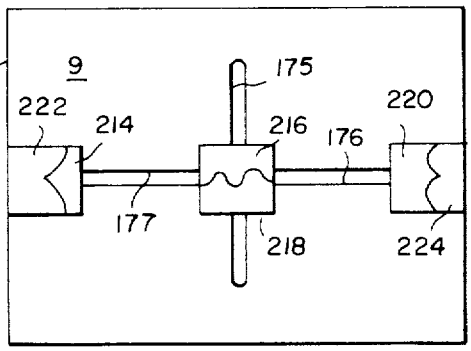
Figure 38:
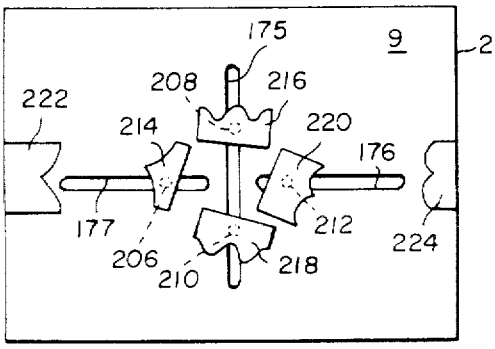
Figure 40:
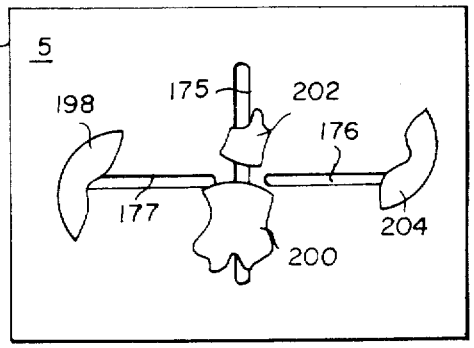

In the embodiment of the puzzle shown in FIGS. 37–40, support member 2 is provided with slots 175, 176, 177. Four puzzle members 198, 200, 202, 204 on side 5 are slidably and rotatably movable within the slots via pins 206, 208, 210, 212 respectively secured thereto into a assembled position to form a circular figure (FIG. 37). In this position, four corresponding puzzle members 214, 216, 218, 220 respectively on the opposite side 9, and also secured to pins 206, 208, 210, 212 respectively are in a disassembled position (FIG. 38). When the disassembled puzzle members are properly assembled (FIG. 39), two members 216, 218 mesh together and the remaining two members 214, 220 mesh with fixed puzzle members 222, 224 respectively secured to support member 2 adjacent ends of slots 176, 177. In this assembled position, puzzle members 198, 200, 202, 204 on the other side 5 are disassembled as seen in FIG. 40.

To facilitate stacking of the puzzles, the support member 2 of each puzzle is provided with posts 226, 228 secured to the sides 5, 9 at each corner as best seen in FIGS. 1 and 1A. Posts 226 are provided with openings or recesses 232 and posts 228 with pegs 230 which are insertable within openings 232 when the puzzles are stacked. As shown in FIG. 1, diagonally opposed pairs of posts 226, 228 on each side are identical with one pair having pegs 230 and the other pair having openings 232. However, other arrangements are possible. For example, all four posts on one side could have pegs and all four posts on the opposite side provided with openings. Still another possibility is to provide all of the posts on one puzzle with openings and all of the posts on another puzzle with pegs.

Although a number of different embodiments of the invention have been illustrated, these are exemplary only and many other combinations of movable and fixed puzzle members, differently shaped specific and abstract figures, and differently arranged slots may be used. Also, the number of fixed and movable puzzle members can vary depending upon the complexity of puzzle desired. While the presently preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A two-sided puzzle comprising:

a substantially flat support member having upper and lower side surfaces;

at least one elongated slot of a finite width extending through said support member from said lower side surface to said upper side surface;

at least a first plurality of separate, [flat] puzzle members adjacent said upper side surface, each puzzle member having a [non-symmetrical] periphery, said puzzle members further being slidably and rotatably movable relative to one another between at least one matched position, in which portions of said peripheries of said plurality of puzzle members match to form a figure [having a symmetrical periphery,] and an unmatched position, in which said plurality of puzzle members are separate and said peripheries thereof do not match;

at least a second plurality of separate, [flat] puzzle members adjacent said lower side surface, each puzzle member having a [non-symmetrical] periphery, said puzzle members further being slidably and rotatably movable relative to one another between at least one matched position, in which portions of said peripheries of said plurality of puzzle members match to form a figure [having a symmetrical periphery,] and an unmatched position, in which said plurality of puzzle members are separate and said peripheries thereof do not match; and means extending through and slidable within said slot for rigidly coupling at least one of said puzzle members of said first plurality of puzzle members to a corresponding puzzle member of said second plurality of puzzle members for slidable and rotatable movement of said coupled puzzle members within said slot whereby slidable and rotatable movement of one of said first and second pluralities of puzzle members to its matched position automatically moves the other of said first and second pluralities of puzzle members to an unmatched position.

2. A two-sided puzzle comprising:

a flat support member having upper and lower side surfaces;

at least one elongated slot extending through said support member from said lower side surface to said upper side surface;

at least a first plurality of separate, [flat] puzzle members adjacent said upper side surface, each puzzle member having a [non-symmetrical] periphery, and at least one member of said puzzle members is slidably and rotatably movable relative to the others for positioning said first plurality of puzzle members into an upper puzzle assembled position, in which portions of the peripheries of the puzzle members are assembled to form a figure [having a symmetrical periphery,] or a disassembled position, in which the puzzle members are separate and disassembed;

at least a second plurality of separate, [flat] puzzle members adjacent said lower side surface, each puzzle member having a [non-symmetrical] periphery, and at least one member of said puzzle members is slidably and rotatably movable relative to the others for positioning said second plurality of puzzle members into a lower puzzle assembled position, in which portions of the peripheries of the puzzle members are assembled to form a figure [having a symmetrical periphery,] or a disassembled position, in which the puzzle members are separate and disassembled; and first means comprising a first connecting member slidable and rotatable within said slot for joining said movable members of said first and second pluralities of puzzle members in a predetermined orientation whereby slidable and rotatable movement of said at least one movable member of one of said first and second pluralities of puzzle members into a puzzle assembled position automatically moves the other at least one movable member of said first and second pluralities of puzzle members into a puzzle disassembled position.

3. A two-sided puzzle according to claim 2 wherein two puzzle members of each of said first and second pluralities of puzzle members are slidably and rotatably movable, and second means are provided comprising a second connecting member slidable and rotatable within said slot for joining said second two puzzle members.

4. A two-sided puzzle according to claim 3, and further comprising third and fourth puzzle members, each having a [non-symmetrical] periphery and rigidly mounted on said upper and lower side surfaces respectively adjacent an end of said slot, said peripheries of said third and fourth puzzle members nesting with portions of the peripheries of said first and second pluralities of puzzle members respectively in their assembled positions.

5. A two-sided puzzle according to claim 2 wherein one other puzzle member of each of said first and second pluralities is rigidly mounted on said upper and lower side surfaces respectively adjacent an end of said slot.

6. A two-sided puzzle according to claim 2 wherein first and second elongated slots extend through said support member, [said first plurality of puzzle members comprises] *comprising* two first pairs of puzzle members adjacent said upper side surface, each first pair having at least one first slidably and rotatably movable member, and [said second plurality of puzzle members comprises] two second pairs of puzzle members adjacent said lower side surface, each second pair having at least one second slidably and rotatably movable member, said first connecting member is slidable and rotatable within said first slot for joining a first movable member of one of said first pairs to a second movable member of one of said second pairs in a predetermined orientation, said puzzle further having second means having a second connecting member slidable and rotatable within said second slot for joining a first movable member of the other of said first pairs to a second movable member of the other of said second pairs.

7. A two-sided puzzle according to claim 6 wherein said first and second slots are joined at one of their ends.

8. A two-sided puzzle according to claim 6 wherein said first and second slots are separate, and one end of one of said first and second slots is spaced from but adjacent to one end of the other of said first and second slots.

9. A two-sided puzzle according to claim 7 or 8 wherein one member of each of said first and second pairs is rigidly fixed on said support member.

10. A two-sided puzzle comprising:

a flat support member having upper and lower side surfaces;

first and second separate elongated slots extending through said support member with one end of one of said first and second slots spaced from but adjacent to one end of the other of said first and second slots;

two pairs of puzzle members adjacent said upper side surface, one of said pairs having one member fixed to said support member in the space between said one end of said first and second slots, and each pair having at least one first movable member for positioning said pairs of puzzle members into upper puzzle assembled or disassembled positions;

two sets of puzzle members adjacent said lower side surface, each set having one member fixed to said support member adjacent each opposite end of said first and second slots, and at least a second movable member for positioning said sets of puzzle members into lower assembled or disassembled positions;

first means comprising a first connecting member slidable within said first slot for joining a first movable member of one of said pairs to a second movable member of one of said sets in a predetermined orientation; and second means comprising a second connecting member slidable within said second slot for joining a first movable member of said other of said pairs to a second movable member of said other of said sets in a predetermined orientation whereby movement of said first movable members of said pairs of puzzle members into puzzle assembled position with said fixed member automatically moves said second movable members of said sets pairs into puzzle disassembled positions, and movement of said second movable members into puzzle assembled positions with said fixed members automatically moves said first movable members into puzzle disassembled positions.

* * * * *